June 7, 1949.    H. C. STAEHLE    2,472,128
COLORING CERAMIC OBJECTS
Filed May 3, 1947

HENRY C. STAEHLE
INVENTOR

BY
ATTORNEYS

Patented June 7, 1949

2,472,128

UNITED STATES PATENT OFFICE 2,472,128

COLORING CERAMIC OBJECTS

Henry C. Staehle, Rochester, N. Y., assignor to Eastman Kodak Company, Rochester, N. Y., a corporation of New Jersey Application May 3, 1947, Serial No. 745,737

3 Claims. (Cl. 95—5.5)

This invention relates to ceramics and particularly to a method for applying colored designs photographically to ceramic objects.

According to the present methods of decorating ceramic objects, the design is applied largely by hand methods, and the ware must be handled many times. This means that one of the basic requirements of a pottery is space in which ware can be stacked between operations. The handling is not only costly but subjects the ware to considerable risk of damage. Furthermore, application of the decoration according to present technique is time-consuming and requires a considerable degree of skill on the part of the operator.

It is, therefore, an object of the present invention to provide a simplified method for applying colored designs to ceramic objects. A further object is to provide a photographic method for decorating ceramic ware according to which the design is produced in a sensitive photographic coating. Other objects will appear from the following description of my invention.

These objects are accomplished by applying a priming coat to a ceramic biscuit and then applying a layer of a bichromated hydrophilic colloid containing an aqueous dispersion of a water-insoluble, soft, synthetic resin and a suitable pigment.

Figure 1:
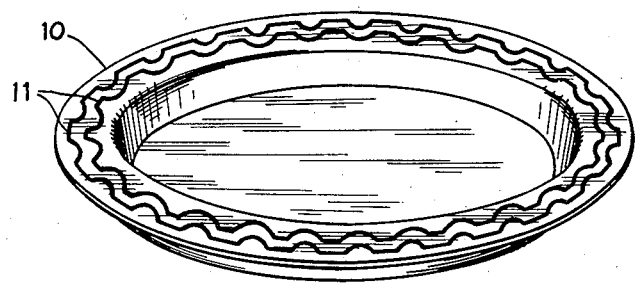
Figure 2:
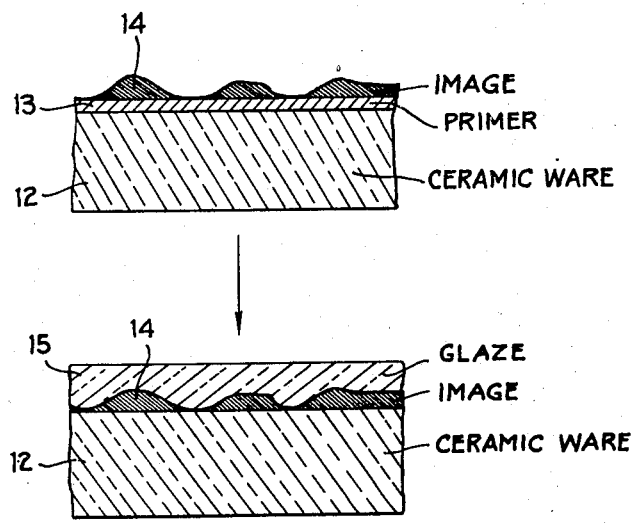

In the accompanying drawing, Fig. 1 is a perspective view of a ceramic object decorated according to my invention and Fig. 2 is a sectional view of a portion of the finished ceramic ware, showing the steps in the process of decoration.

According to my invention, a ceramic biscuit, that is, a ceramic object which has been fired once but which is unglazed, is coated with a thin layer of a resinous material as a priming coat. A suitable priming coat is the following:

Polyvinyl butyral _____ g___ 10
Methyl ethyl ketone _____ cc___ 500
Cellosolve _____ cc___ 200

The priming coat may contain a dye such as the yellow dye described in Example 4 of McNally and Dickey U. S. Patent 2,183,997. A suitable amount of this dye is one gram in the 300 cc. of the above priming solution. The purpose of the dye is to give a visual check on the uniformity of coating of the primer and to serve as a blue absorbing base for the sensitive layer applied to it. Using dye in the priming coat, any areas not coated are readily visible. Moreover, with the dye in the priming coat, the fine details in the exposure are retained and cleaner backgrounds are also possible.

Another material which may be used as a primer for the polymethyl acrylate or polyethyl acrylate coatings described below is a solution of polyvinyl pyridine (French Patent 849,126) in a suitable solvent. This material coated out of solvent solution such as methyl ethyl ketone, methyl or ethyl alcohol, ethylene chloride, etc., forms an extremely tenacious bond with glazed surface providing it is not subjected to an acid solution. The sensitive coating to be applied to it adheres more satisfactorily if the polyvinyl pyridine is combined with another resin such as a coumarone indene resin. I have found that a mixture of approximately equal parts of a 10% solution of polyvinyl pyridine, methyl ethyl ketone and a lacquer composed of 50% toluol, 40% coumarone resin and other resins, and 10% naphtha and plasticizer, diluted with 3 to 6 volumes of methyl ethyl ketone constitutes an excellent primer. As in the case of the other primers described above, it is advisable to add 1 to 4 grams of the yellow dye described above (U. S. Patent 2,183,997) to 100 cc. of diluted primer.

The sensitive coating next applied consists of a mixture of a bichromated hydrophilic colloid containing an aqueous dispersion of a water-insoluble, soft synthetic resin as described in my U. S. application, Serial Number 558,346, filed October 12, 1944. The soft, synthetic resin is one which is capable of drying to a continuous film when the aqueous dispersion is coated on glass. An acrylate resin such as polymethylacrylate or polyethylacrylate is suitable for this purpose. Other dispersions such as a plasticized polystyrene dispersion, plasticized polyvinylidene chloride, a polyvinyl acetate dispersion, or neoprene latex may also be used. A dispersion of plasticized cellulose acetate in water is also suitable.

My prior application, Serial Number 558,346, discloses the incorporation of white pigments such as titanium oxide or colored pigments such as carbon black, cobalt blue or yellow ochre in the sensitive mixture. For purposes of the present invention, these pigments are replaced with colored pigments suitable for use on ceramic materials such as cobalt carbonate, or commercially available colors known as underglaze colors, iron carbonate or any insoluble copper, nickel, uranium or manganese compound in as concentrated a form as possible. Cupric carbonate may be converted to black cupric sulfide. Pigments containing lead, such as lead carbonate, presumably form lead chromate and destroy the sensitivity of the photographic material. For this reason any material which contains lead should be avoided. The pigments should, of course, retain their color during and after glazing and firing the ceramic ware.

The following formula for the sensitive material has been found satisfactory.

Cobaltous carbonate _____ pound__ 1
Sodium hexametaphosphate _____ grams__ 25
Water _____ cc__ 600

This mixture is milled in a ball mill for 24 hours and the pebbles are then rinsed with distilled water to make one liter of suspension. To this there is added 450 cc. of commercial 25% dispersion of polymethyl acrylate or polyethyl acrylate in water. A separate solution of 300 grams of gelatin in 750 cc. of water is made up, melted on a water bath, strained and to it are added 45 grams of ammonium thiocyanate dissolved in 50 cc. of water.

The gelatin solution is added slowly and with vigorous stirring to the cobaltous carbonate and resin dispersion mixture. Finally, 50 cc. of a 20% solution of ammonium bichromate are added and the mixture is coated on the primed ceramic ware.

The ammonium thiocyanate is added to the mixture to prevent the tendency of the cobalt carbonate to cause the gelatin to set.

The sensitive mixture may be applied to the ceramic ware by spraying, although somewhat better results are obtained by a whirling technique, similar to that used in the photomechanical industry. By whirling it is possible to obtain thicker coating and at the same time have less background density, whereas a coating applied by spraying usually results in a faint background color.

The coated and dried ceramic ware is exposed to an object or under a photographic transparency as described in my prior application, Serial Number 558,346. If the ceramic object has a non-flat surface as is usual, a method such as that described in Murray U. S. Patent 2,073,313, March 9, 1937, may be used to expose the coated ceramic object.

After exposure, the ceramic object is immersed in an ammonia solution of approximately 2% strength at a temperature of between 120° and 140° F. The exposed areas swell almost immediately and a rather gentle stream of water of about the same temperature removes all traces of the exposed area. To insure absolute cleaning of the background a moderate spray of water may be used since the image itself is quite tough.

After the image has been formed, a clear glaze customarily employed in the art is applied and the ware is fired a second time. This results in a so-called "underglaze" decoration.

In the drawing, Fig. 1 shows a ceramic object 10, such as a dinner plate, having thereon a colored decoration 11 applied according to my invention. Fig. 2 illustrates in sectional views the steps of processing the ceramic material. As shown in the first stage of Fig. 2, the ceramic ware 12 has thereon, before glazing, a layer 13 of primer and an image 14. After applying the overglaze, as shown in the second stage of Fig. 2, the primer has burned away, leaving the support 12 with the image 14 and overglaze 15.

It will be understood that my invention is to be taken as limited only by the scope of the appended claims.

I claim:
1. The method of decorating ceramic ware which comprises coating ceramic biscuit with a resinous coating, then with a mixture of a bichromated hydrophilic colloid, an aqueous dispersion of a water-insoluble, soft synthetic resin of the group consisting of polymethylacrylate, polyethylacrylate, polystyrene, polyvinylidene chloride, polyvinylacetate and neoprene, said resin being capable of drying to a continuous film when the dispersion is coated on glass, and a pigment, which will be colored after firing, drying said coating, exposing said coating to an image, washing away the exposed portions of said coating to leave said coating containing pigment in the unexposed portions, and glazing and firing said biscuit to form a finished ceramic object.

2. The method of decorating ceramic ware which comprises coating ceramic biscuit with a resinous coating, then with a mixture of bichromated gelatin, an aqueous dispersion of a water-insoluble, soft, acrylate resin, and a colored pigment which retains its color after the after-mentioned glazing and firing, drying said coating, exposing said coating to an image, washing away the exposed portions of said coating to leave said coating containing pigment in the unexposed portions, and glazing and firing said biscuit to form a finished ceramic object.

3. The method of decorating ceramic ware which comprises coating ceramic biscuit with a water-insoluble polyvinyl resin primer, then with a sensitizing coating comprising a mixture of bichromated gelatin, an aqueous dispersion of a water-insoluble, soft acrylate resin, and a colored pigment which retains its color after glazing and firing the ceramic ware, exposing said sensitized coating to light under a positive image to render the exposed parts non-adhesive to the ceramic ware, washing away only the exposed parts of said coating, and glazing and firing said biscuit to form a finished ceramic object.

HENRY C. STAEHLE.

REFERENCES CITED

The following references are of record in the file of this patent:

UNITED STATES PATENTS

| Number | Name | Date |
| --- | --- | --- |
| 1,981,102 | Hagedorn | Nov. 20, 1934 |
| 2,184,310 | Meigs | Dec. 26, 1939 |

FOREIGN PATENTS

| Number | Country | Date |
| --- | --- | --- |
| 7,800 | Great Britain, 1909 | Jan. 6, 1910 |